April 7, 1936.　　　　K. MIDDELBOE　　　　2,036,951
TREATMENT OF CEMENT RAW MATERIALS AND THE LIKE
Filed Feb. 15, 1934　　　3 Sheets-Sheet 3

INVENTOR
Kristian Middelboe
BY
Redding, Greeley, O'Shea & Campbell
ATTORNEYS

Patented Apr. 7, 1936

2,036,951

UNITED STATES PATENT OFFICE 2,036,951

TREATMENT OF CEMENT RAW MATERIALS AND THE LIKE

Kristian Middelboe, Frederiksberg, near Copenhagen, Denmark, assignor to F. L. Smidth & Co., New York, N. Y., a corporation of New Jersey Application February 15, 1934, Serial No. 711,326
In Great Britain April 8, 1933

10 Claims. (Cl. 263—32)

In various industries it is sometimes desired to subject more or less finely divided material to a drying or a heating operation or to an operation which is both drying and heating, preliminary to further treatment of the material. Such treatment is well known in the cement industry, in connection with which the present invention has been developed, although it will be seen, as this description proceeds, that the invention is applicable to the treatment of materials in other industries. In the cement industry, for example, cement raw material either in the form of slurry, prepared by the wet process, or in the form of pulverulent material prepared by the dry process and perhaps moistened with water, has been applied to the surfaces of carrier bodies of metal or other heat resistant material, the carrier bodies, with their coatings of cement raw material, being subjected to the action of hot gases from the kiln in which the further treatment of the material is carried on. Hitherto such coated carrier bodies have been kept continuously in relative motion with respect to one another while the hot gases passed through the layer of coated bodies but this procedure resulted in crushing of the material between the relatively moving bodies and the formation of dust, whereas, in the treatment of such material preliminary to its introduction into the kiln, it is desirable that the material shall be in the form of granules or nodules without the formation of dust. It is the object of the present invention to make it possible to carry on such preliminary treatment of cement or other raw material in a continuous operation, capable of insuring a uniform supply of the dried and heated or dried or heated material for further treatment in a kiln or otherwise and at the same time to avoid the crushing of the granules or nodules and the formation of dust. In accordance with the present invention the material to be treated may be applied to a mass of carrier bodies so as to coat the bodies, as by permitting the material to percolate through the mass while the carrier bodies are relatively at rest or are stirred mechanically, after which the mass of coated carrier bodies, relatively at rest with respect to one another, are subjected to the action of the hot gases from the kiln or other suitable medium, until the material has been thoroughly dried upon the surface of the carrier bodies and heated at least to some extent, when as by mechanical operation, the dried material is separated from the carrier bodies and conducted to the kiln or elsewhere, while the carrier bodies, thus freed from the coating of material, are in readiness to receive another coating. In the practice of the invention the carrier bodies are so supported as to permit them to be coated with material and to permit the hot gases from the kiln or other medium to pass through the interstices of the mass, being supported, for example, upon or by a gas-permeable wall. The carrier bodies are relatively at rest with respect to one another while they are subjected to the action of the hot gases or other medium, but when the material which coats the bodies has become thoroughly dry the separation of the material from the bodies is effected by agitation of the bodies, as by mechanical stirrers. The mass of carrier bodies may be in constant bodily or mass movement during the application of the material, the passage of the hot gases and the separation of the material from the bodies, as by being supported by a rotating annular receptacle while the devices supplying the material to be treated are located in fixed positions or the entire mass of carrier bodies may be supported in a fixed receptacle while devices for supplying the material and for stirring the mass are moved with respect to the receptacle.

To protect the apparatus from the destructive action of the hot gases from the kiln the gases may be directed first into and through the mass of bodies so that they are cooled somewhat before they reach the gas-permeable wall or support.

It will be obvious that the carrier bodies may be made of any suitable material, such as metal, fire-brick, porcelain, or other heat resistant material and may be made in any convenient form.

The invention will be more fully explained hereinafter with reference to the accompanying drawings in which it is illustrated, and in which.

Figure 1:
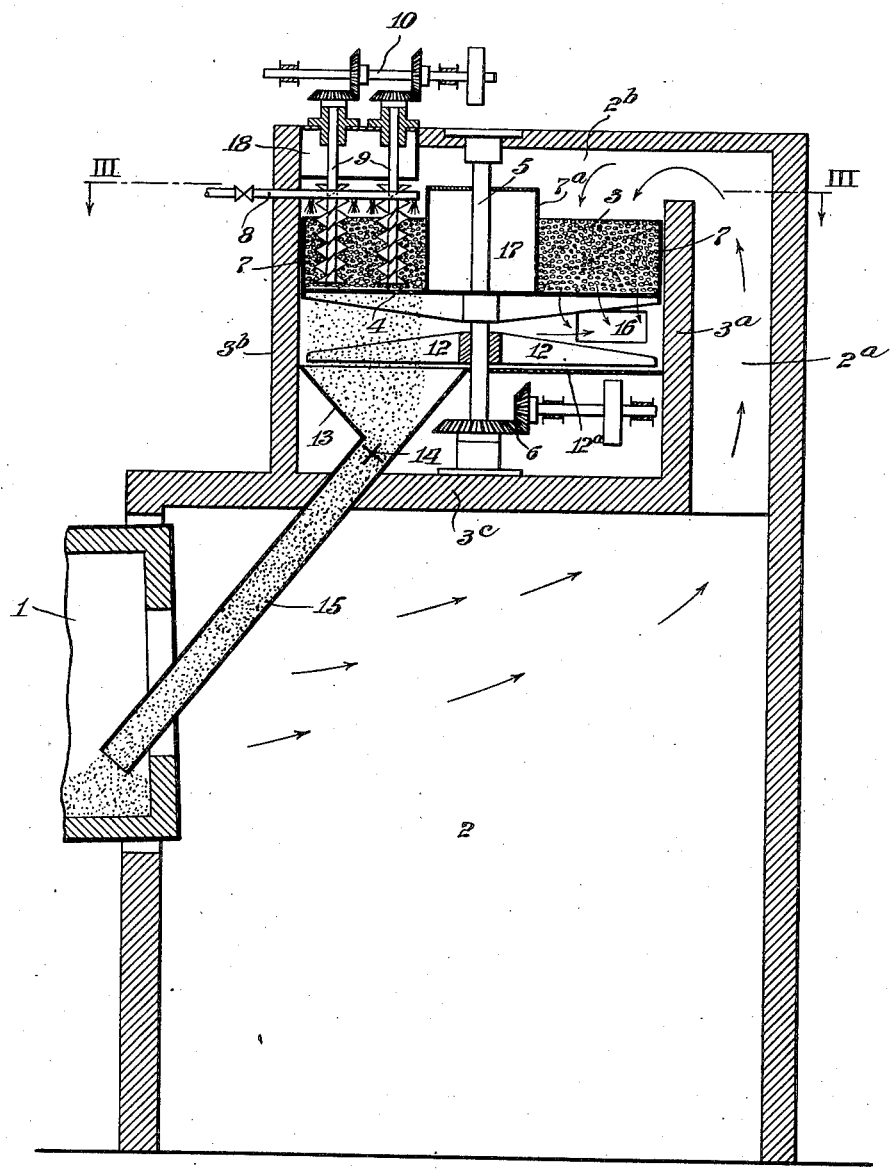
Figure 1 is a view in sectional elevation, partly diagrammatic, of one form of apparatus in which the invention may be embodied, a portion of the upper or feed end of a rotary kiln being also shown, the mass of carrier bodies being in this instance moved about a vertical axis.
Figure 3:
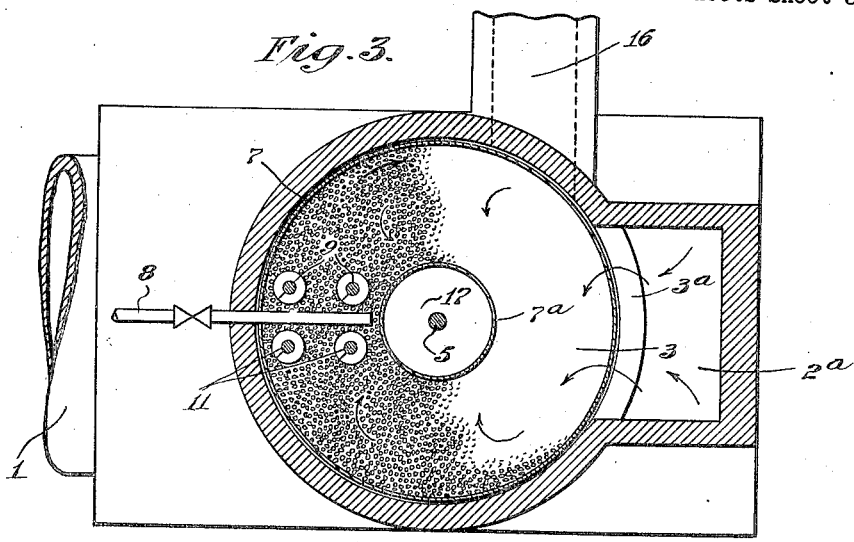
Figure 3 is a view in horizontal section on the plane indicated by the broken line III—III of Figure 1.

In the embodiment of the invention shown in Figures 1 and 3 the upper or feeding end of the rotary kiln, into which the material, after preliminary treatment, is discharged and from which the hot gases, which may be utilized in the preliminary treatment of the material, are supplied, is shown at 1. From the kiln the gases pass into the usual dust chamber 2 and thence, through a flue 2ª, to a space 2ᵇ from which they pass downward upon and through the mass of carrier bodies indicated at 3 and through a gas-permeable support 4 which forms the substantially horizontal bottom of a receptacle mounted on a vertical axis. The mass of bodies is supported within a chamber formed by the walls 3ª, 3ᵇ and 3ᶜ and the gases which have passed through the mass of bodies may escape from such chamber through a flue indicated at 16.

The gas-permeable bodies 3 are received in an annular receptacle formed by a gas-permeable bottom wall 4, an imperforate outer wall 7 and an imperforate inner wall 7ª which is of such diameter as to form an insulating chamber 17. The receptacle is supported by a vertical shaft 5 to which rotary motion may be imparted by suitable gearing, indicated at 6. The material to be dried and heated preparatory to its introduction into the kiln 1 may be supplied continuously in fluent form, through a pipe line 8, from which it is discharged upon the material in the container as it moves below the pipe 8, the material percolating downward through the mass of bodies. In some cases it may be desirable to effect relative movement of the carrier bodies at the time when the material is supplied thereto in order that the bodies, throughout the depth of the mass, may be coated with the material. For this purpose there may be provided, as shown in Figures 1 and 3, screw stirrers 9 driven by suitable gearing from an overhead shaft 10. Whether or not such stirrers are employed the material is distributed evenly over the surfaces of the carrier bodies at or near the point at which the material is supplied, but after the carrier bodies have been so coated with the material the bodies themselves, although moving as a mass, remain relatively at rest with respect to one another and during this time while the bodies are so relatively at rest, the hot gases or other medium employed pass through the interstices of the mass, drying the coating of material on the carrier bodies and heating the material and incidentally the carrier bodies themselves somewhat. At some point sufficiently remote from the supply of material to permit the coatings of material on the carrier bodies to become thoroughly dried and heated, it may be, the material is separated from the carrier bodies. This may be accomplished conveniently by agitation of the mass of coated carrier bodies, as by stirring the same by means of vertical screw stirrers, indicated at 11, and, it may be, driven by means similar to those employed for driving the stirrers 9. The dried material thus separated from the carrier bodies descends through the mass and escapes through the perforated support 4, falling into a hopper 13 from which it passes, past an air-tight seal in the form of a bucket wheel 14, through a chute 15 into the kiln 1. Such parts as may be subject to destructive action of the hot gases, may, if desired, be protected by air or water supplied shields, as at 17 and 18. Such material as falls on the plate 12ª may be swept into the hopper 13 by blades 12 which revolve with the shaft 5.

Figure 2:
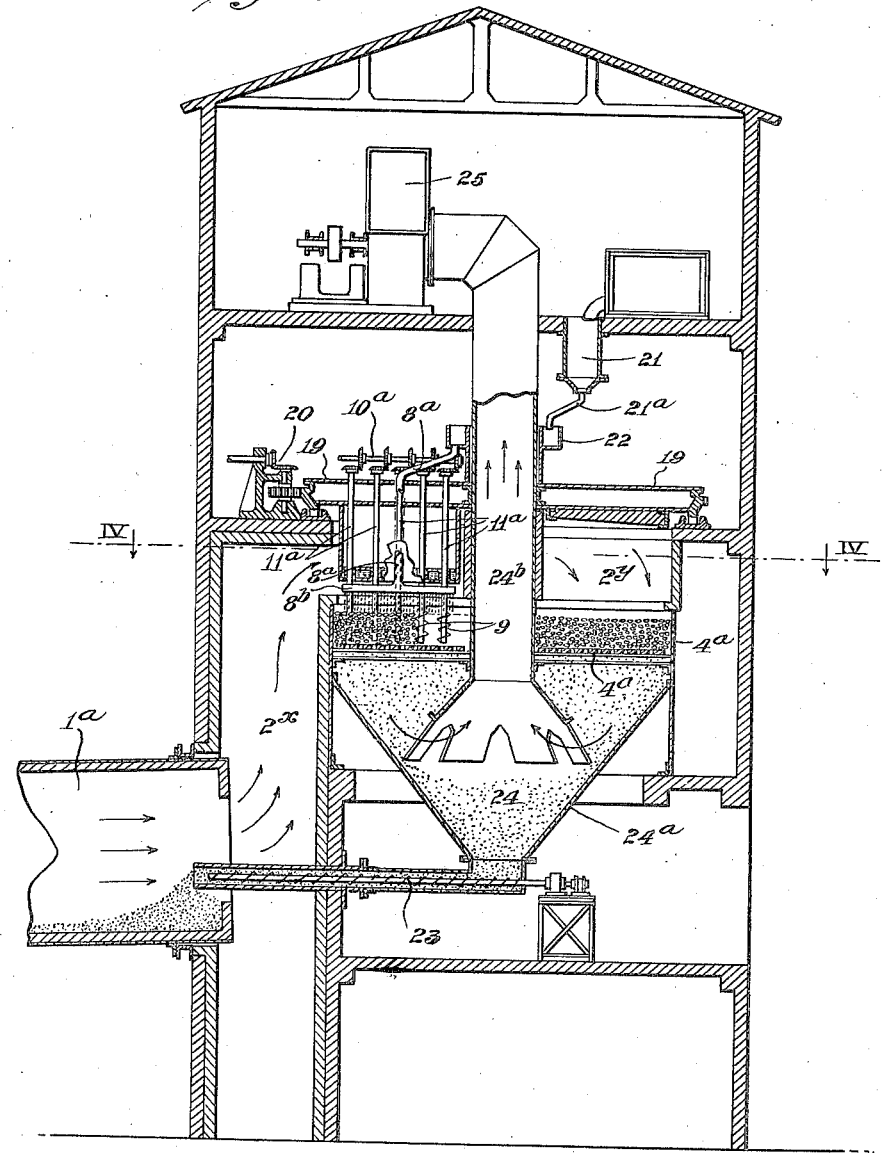
Figure 2 is a similar view of another form of apparatus in which the invention may be embodied, the mass of carrier bodies in this instance being stationary.
Figure 4:
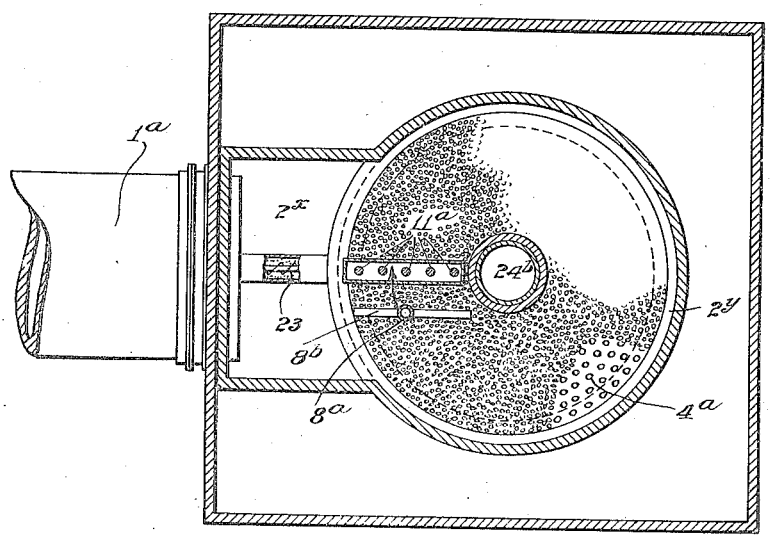
Figure 4 is a view in horizontal section on the plane indicated by the broken line IV—IV of Figure 2.

In the embodiment of the invention illustrated in Figures 2 and 4 the receptacle 4ª for the carrier bodies is stationary. The fluent material to be treated is delivered from a fixed tank 21 through a pipe 21ª to an open, annular tank 22 which is supported with a turntable 19 so as to rotate therewith. The material is delivered from the annular tank 22 through a pipe 8ª to a distributing head 8ᵇ from which the material is discharged upon the upper surface of the mass of carrier bodies. In this instance, the layer of carrier bodies being relatively thin, it is assumed that the material supplied by the distributing head 8ᵇ percolates through the mass and coats all of the carrier bodies as the distributor head moves over the mass, the stirrers, such as the stirrers 9 of Figure 1, being dispensed with. The carrier bodies in this instance are at all other times relatively at rest and the hot gases from the kiln 1ª are conducted through a chamber 2ˣ to a chamber 2ʸ above the mass of carrier bodies and pass downward through the mass of carrier bodies and through the gas-permeable bottom of the receptacle 4ª into a chamber 24 formed by a hopper 24ª from which they pass through a flue 24ᵇ to an exhaust fan 25 by which they are drawn from the chamber 24 and are discharged into the stack. The separation of the dried coating from the carrier bodies is accomplished in the same manner as before, that is, by mechanical agitation or stirring, as by vertical screw stirrers 11ª driven from a common shaft 10ª and supported by the turntable 19 which forms a cover for the chamber 2ʸ and is rotated through suitable gearing indicated at 20. The shaft 10ª may be rotated by any suitable means, not necessary to be shown. The dried material which is separated from the carrier bodies by the stirrers 11ª passes downward through the mass of carrier bodies in the receptacle 4ª and is discharged through the gas-permeable bottom thereof into the hopper 24ª from which it may be delivered by a worm conveyor 23 into the kiln 1ª. It will be understood that the material is delivered to the carrier bodies shortly after the passage of the stirrers 11ª, so that there is ample time for the drying of the coatings of material on the surfaces of the carrier bodies before the dried material is separated therefrom.

It will be understood that the invention is applicable to the drying of any material which can be distributed upon a mass of carrier bodies although it has been developed with particular reference to its use in the drying, the preheating and the partial calcination of cement raw materials prepared according to either the wet process or the dry process and supplied either in the form of slurry or in the form of dry raw meal to which water may have been added to bring the meal into such a state that the material may be distributed in the form of a film over the surface of the carrier bodies.

It will be understood that various changes in details of construction and arrangement may be made to suit different conditions of use and that, except as pointed out in the accompanying claims, the invention is not limited to the particular constructions shown and described herein.

I claim as my invention:

1. The method of effecting treatment of cement raw materials and the like preparatory to subsequent treatment which consists in supporting a mass of independent carrier bodies relatively at rest, applying the material to the mass of carrier bodies and causing a coating of material to be formed thereon, causing a heated medium to pass through the mass of carrier bodies and material thereon while the carrier bodies are relatively at rest, and finally separating the material from the carrier bodies.

2. The method of effecting treatment of cement raw materials and the like preparatory to subsequent treatment which consists in supporting a mass of independent carrier bodies relatively at rest, applying the material to the mass of carrier bodies and causing a coating of material to be formed thereon, causing a heated medium to pass through the mass of carrier bodies and material thereon while the carrier bodies are relatively at rest, and finally agitating the carrier bodies to separate the dried material therefrom.

3. The method of effecting treatment of cement raw materials and the like preparatory to subsequent treatment which consists in supporting a mass of independent carrier bodies relatively at rest, applying the material to the mass of carrier bodies, permitting the material to percolate through the mass of carrier bodies and causing a coating of material to be formed thereon, then causing a heated medium to pass through the mass of carrier bodies and material thereon while the carrier bodies are relatively at rest, and finally agitating the carrier bodies to separate the dried material therefrom.

4. Apparatus for the treatment of cement slurry preparatory to subsequent treatment which comprises a receptacle mounted on a vertical axis and having a substantially horizontal gas-permeable bottom, a mass of independent carrier bodies supported on the bottom in a state of relative rest during the heat treatment, means to supply the slurry to the carrier bodies whereby the bodies are coated with the slurry, means to cause a heated medium to pass through the mass of slurry coated carrier bodies in the receptacle while the carrier bodies are relatively at rest, and means to separate the dried material from the bodies.

5. Apparatus for the treatment of cement slurry preparatory to subsequent treatment which comprises a receptacle mounted on a vertical axis and having a substantially horizontal gas-permeable bottom, a mass of independent carrier bodies supported on the bottom in a state of relative rest during the heat treatment, means to supply the slurry to the carrier bodies whereby the bodies are coated with the slurry, means to cause a heated medium to pass through the mass of slurry coated carrier bodies in the receptacle while the carrier bodies are relatively at rest, and means for agitating the bodies as the material is supplied thereto and also after the coated bodies have been subjected to the action of the heated medium.

6. Apparatus for the treatment of cement raw materials and the like preparatory to subsequent treatment which comprises a mass of independent carrier bodies, a substantially horizontal receptacle in which the carrier bodies are received and are relatively at rest, means for supplying the material to the mass of carrier bodies whereby the carrier bodies are coated with the material, stirrers for agitating the carrier bodies as the material is supplied thereto, means to cause a heated medium to pass through the mass of carrier bodies and the material in the receptacle while the carrier bodies are relatively at rest, and means to separate the dried material from the carrier bodies.

7. Apparatus for the treatment of cement raw materials and the like preparatory to subsequent treatment which comprises a mass of independent carrier bodies, a substantially horizontal receptacle in which the carrier bodies are received and are relatively at rest, means for supplying the material to the mass of carrier bodies whereby the carrier bodies are coated with the material, means to cause a heated medium to pass through the mass of carrier bodies and the material in the receptacle while the carrier bodies are relatively at rest, and stirrers to effect separation of the dried material from the carrier bodies.

8. Apparatus for the treatment of cement raw materials and the like preparatory to subsequent treatment which comprises a mass of independent carrier bodies, a substantially horizontal gas-permeable receptacle in which the carrier bodies are received and are relatively at rest, means for supplying the material to the mass of carrier bodies whereby the carrier bodies are coated with the material, means to cause a heated medium to pass through the gas-permeable receptacle, the mass of carrier bodies and the material therein while the carrier bodies are relatively at rest, means to rotate the receptacle about a vertical axis, and means to separate the dried material from the carrier bodies.

9. Apparatus for the treatment of cement raw materials and the like preparatory to subsequent treatment which comprises a mass of independent carrier bodies, a substantially horizontal rotary receptacle in which the carrier bodies are received and are relatively at rest, means for supplying the material to the mass of carrier bodies at one point in their mass movement with the receptacle whereby the carrier bodies are coated with the material, means to cause a heated medium to pass through the mass of carrier bodies and the material in the receptacle while the carrier bodies are relatively at rest and during the continued movement of the receptacle, means to rotate the receptacle about a vertical axis, and means to separate the dried material from the carrier bodies.

10. Apparatus for the treatment of cement raw materials and the like preparatory to subsequent treatment which comprises a mass of independent carrier bodies, a substantially horizontal stationary annular receptacle in which the carrier bodies are received and are relatively at rest, means for supplying the material to the mass of carrier bodies whereby the carrier bodies are coated with material, means to cause a heated medium to pass through the mass of carrier bodies and the material in the receptacle while the carrier bodies are relatively at rest, means to separate the dried material from the carrier bodies, and rotary means to support the material supplying means and the material separating means.

KRISTIAN MIDDELBOE.